United States Patent
Michiels et al.

(10) Patent No.: US 9,025,765 B2
(45) Date of Patent: May 5, 2015

(54) DATA SECURITY

(75) Inventors: Wilhelmus Petrus Adrianus Johannus Michiels, Eindhoven (NL); Paulus Mathias Hubertus Mechtildis Antonius Gorissen, Eindhoven (NL); Boris Skoric, Eindhoven (NL)

(73) Assignee: Irdeto B.V., Hoofddorp (NL)

( * ) Notice: Subject to any disclaimer, the term of this patent is extended or adjusted under 35 U.S.C. 154(b) by 821 days.

(21) Appl. No.: 12/600,068

(22) PCT Filed: May 19, 2008

(86) PCT No.: PCT/IB2008/051960
§ 371 (c)(1),
(2), (4) Date: Nov. 13, 2009

(87) PCT Pub. No.: WO2008/142633
PCT Pub. Date: Nov. 27, 2008

(65) Prior Publication Data
US 2010/0215173 A1  Aug. 26, 2010

(30) Foreign Application Priority Data
May 22, 2007  (EP) .................... 07108580

(51) Int. Cl.
*H04L 9/28* (2006.01)
*G06F 21/52* (2013.01)
*G06F 21/10* (2013.01)

(52) U.S. Cl.
CPC ............. *G06F 21/52* (2013.01); *G06F 21/10* (2013.01); *G06F 2221/2107* (2013.01)

(58) Field of Classification Search
CPC ...................................................... G06F 15/16
USPC ........... 380/28, 37, 277; 726/27, 21; 713/189, 713/190
See application file for complete search history.

(56) References Cited

U.S. PATENT DOCUMENTS 6,334,189 B1 * 12/2001 Granger et al. .................. 726/26
6,742,122 B1 *  5/2004 Morishita ..................... 713/189
(Continued)

FOREIGN PATENT DOCUMENTS

FR      2881254 A1    7/2006
JP      09282155      10/1997
(Continued)

OTHER PUBLICATIONS http://www.cs.colorado.edu/~jrblack/class/csci7000/s05/project/oorschot-whitebox.pdf "White-Box Cryptography and an AES Implementation"—Chow et al, Cloakware, Aug. 2002.*

(Continued)

*Primary Examiner* — Randy Scott
(74) *Attorney, Agent, or Firm* — Marc S. Kaufman; Amardeep S. Grewal; Reed Smith LLP (57) ABSTRACT

A system 100 for increasing data security comprises predetermined system data 104 to be protected. A cryptographic unit 108 is used for cryptographic processing of respective blocks of the content data in dependence on respective keys. A key provider 106 determines the respective key used for the processing of a respective block of the content data in dependence on a respective portion 112 of the predetermined system data 104, the portion not including all the predetermined system data, wherein different respective portions of the predetermined system data are selected for the respective blocks of content data. A server system 200 for increasing data security comprises an output 202 for providing processed content data 110 to a client system 100, the client system comprising predetermined system data 104 to be protected. The server system 200 also comprises a cryptographic unit 208 and a key provider 206.

19 Claims, 4 Drawing Sheets

(56) References Cited

U.S. PATENT DOCUMENTS

| | | | |
|---|---|---|---|
| 7,987,510 B2* | 7/2011 | Kocher et al. | 726/27 |
| 2002/0023209 A1* | 2/2002 | Domstedt et al. | 713/160 |
| 2004/0039924 A1* | 2/2004 | Baldwin et al. | 713/189 |
| 2004/0107356 A1* | 6/2004 | Shamoon et al. | 713/193 |
| 2004/0133794 A1 | 7/2004 | Kocher et al. | |

FOREIGN PATENT DOCUMENTS

| | | |
|---|---|---|
| JP | 11039156 | 2/1999 |
| JP | 2000122861 A | 4/2000 |
| JP | 2006238154 A | 9/2006 |
| WO | 9842098 A1 | 9/1998 |
| WO | 02052388 A2 | 7/2002 |
| WO | 2005060147 A1 | 6/2005 |
| WO | WO 2005060147 A1 * | 6/2005 |
| WO | 2007105126 A2 | 9/2007 |
| WO | WO 2007105126 A2 * | 9/2007 |

OTHER PUBLICATIONS http://crypto.stanford.edu/DRM2002/whitebox.pdf "White-Box DES Implementation for DRM Applications"—Chow et al, Cloakware, Nov. 2002.*

Chow et al: "White-Box Cryptography and an AES Implementation"; Selected Areas of Cryptography (SAC): 9th Annual International Workshop, Aug. 15-16, 2002 in St. John's, Newfoundland, Canada, LNCS 2595, pp. 250-270.

Chow et al: "A White-Box DES Implementation for DRM Applications"; Digital Rights Management (DRM): ACM CCS-9 Workshop, Nov. 18, 2002 in Washington, D.C., USA, LNCS 2696, pp. 1-15.

"International Application No. PCT/IB2008/051960, International Preliminary Report on Patentability, Written Opinion and International Search Report issued Nov. 24, 2009", 9 pgs.

* cited by examiner

DATA SECURITY

FIELD OF THE INVENTION

The invention relates to increasing data security.

BACKGROUND OF THE INVENTION

The use of the Internet as a distribution medium for copyrighted content has created the challenge to secure the interests of the content provider. In particular it is required to warrant the copyrights and business models of the content providers. Increasingly, consumer electronics platforms are operated using a processor loaded with software. Such software may provide the main part of the functionality for rendering (playback) of digital content, such as audio and/or video. One way to enforce the interests of the content owner including the terms and conditions under which the content may be used, is by having control over the playback software. Where traditionally many consumer electronics platforms implemented in for example televisions or DVD players used to be closed, nowadays more and more platforms at least partially are open. This applies in particular to the PC platform, because some users may be assumed to have complete control over the PC hardware and software that provides access to the content. Also, users may be assumed to have a large amount of time and resources to attack and bypass any content protection mechanisms. As a consequence, content providers must deliver content to legitimate users across an insecure network and to a community where not all users or devices can be trusted.

Digital rights management systems often use encryption methods to prevent unauthorized use of content and/or digital signature methods to enable tracking the source of illegally distributed content. One of the issues arising in digital rights management is that the software code that enforces the terms and conditions under which the content may be used must not be tampered with.

Two areas of vulnerability of digital rights management relying on encryption are the software components which enforce the terms and conditions under which the content may be used, and the key distribution and handling. An attacker aiming to remove the enforcement of the terms and conditions may attempt to achieve this through tampering of the program code comprised in the software components. In relation to key handling, for playback a media player has to retrieve a decryption key from a license database. It then has to store this decryption key somewhere in memory for the decryption of the encrypted content. This provides an attacker with two options for an attack on the key. Firstly, reverse engineering of the license database access function could result in black box software (i.e., the attacker does not have to understand the internal workings of the software function), allowing the attacker to retrieve asset keys from all license databases. Secondly, by observation of the accesses to memory during content decryption, it may be possible to retrieve the asset key. In both cases the key is considered to be compromised.

Tamper-resistant software denotes software that has special features to complicate goal-directed tampering. Various techniques for increasing the tamper resistance of software applications exist. Most of these techniques are based on hiding the embedded knowledge of the application by adding a veil of randomness and complexity in both the control and the data path of the software application. The idea behind this is that it becomes more difficult to extract information merely by code inspection. It is therefore more difficult to find the code that, for example, handles access and permission control of the application, and consequently to change it. However, these techniques for increasing the tamper resistance of software applications are not always satisfactory.

SUMMARY OF THE INVENTION

It would be advantageous to have an improved system for increasing data security. To better address this concern, in a first aspect of the invention a system is presented that comprises an input for receiving content data to be processed;

predetermined system data to be protected;

a cryptographic unit for cryptographic processing of respective blocks of the content data in dependence on respective keys;

a key provider for determining the respective key used for the processing of a respective block of the content data in dependence on a respective portion of the predetermined system data, the portion not including all the predetermined system data, wherein different respective portions of the predetermined system data are selected for the respective blocks of content data.

Since the key depends on the selected portion of the system data, a change to this selected portion of the system data by a malicious user will also change the key, and thus hinder the cryptographic processing of a respective content block to be successful. In this way, the selected portion is protected against tampering. Because different respective portions are used for respective content blocks, a relatively large number of data bits is protected against tampering. Another advantage is that the system enables creation of system data specific ciphertexts; the cryptographic processing can only be successful if the same system data is available to the system, because the key depends on the system data. This enhances the security, as generally this system data will not be made available to at least some of the systems that are not authorized to process the content data.

In an embodiment, the predetermined system data comprises software code comprising computer executable instructions. In this case, the software code is protected against unauthorized modifications, because changing the software code means that the processing is disturbed whenever the key depends on the changed portion of the software code. For example, the software code to be protected comprises instructions relevant to enforcing digital rights management.

In an embodiment, the key provider is arranged for selecting the portion of the predetermined system data in dependence on the content data outside the respective block of the content data. This is a very efficient way to select the same portion of the predetermined system data both on the transmitting side and the receiving side. It introduces a randomness in selected portions, because the content data in general has some randomness.

In an embodiment, the key provider is arranged for selecting the portion based on a ciphertext of the content data. Because the ciphertext has better random properties than the plaintext, the selection of the portion of the software code in this case also has better random properties.

In an embodiment, the key provider is arranged for selecting the portion based on the ciphertext of a previously processed data block. The ciphertext of a previously processed data block is readily available at the time the selected portion is needed for processing the current data block. This is true both at the receiving end and at the transmitting end.

In an embodiment, the key provider is arranged for computing a pseudo-random function of the selected portion to obtain the cryptographic key. The pseudo-random character makes it more difficult to break the encryption scheme. In another embodiment, the pseudo-random function is a hash function.

In an embodiment, the cryptographic unit is arranged for applying an XOR operation involving at least part of the respective key and at least part of the respective block of the content data. An XOR function is particularly efficient to execute and is still not easy to break.

An embodiment comprises a storage for storing a ciphertext corresponding to the content data, wherein the cryptographic unit is arranged for decrypting the stored content data. The storage allows the content data to be stored and retrieved whenever this is desirable. As the ciphertext depends on the predetermined system data, the stored content data cannot be used by other systems that do not have this system data. Therefore, the storage is relatively secure.

In an embodiment, the cryptographic unit comprises an encrypter for encrypting the respective blocks of the content data received from the input in dependence on the respective keys and for storing the encrypted content data using the storage; and a decrypter for decrypting respective blocks of the encrypted content data stored using the storage in dependence on the respective keys.

Because the key is system specific (i.e.: depends on the predetermined system data), the encryption and decryption can advantageously be performed on the same system. One suitable application of this is the case where content is encrypted and stored locally on a system for later decryption and use by the same system.

In an embodiment, the cryptographic unit is arranged for applying a digital watermark to the content data in dependence on the respective key. As the digital watermark is dependent on the key data, it is dependent on the predetermined system data. Therefore, the digital watermark can be used to identify the system data that was used to watermark the content data.

An embodiment comprises a server system for increasing data security comprising an input for receiving content data to be processed;

an output for providing processed content data to a client system, the client system comprising predetermined system data to be protected;

a cryptographic unit for cryptographic processing of respective blocks of the content data in dependence on respective keys;

a key provider for determining the respective key used for the processing of a respective block of the content data in dependence on a respective portion of the predetermined system data, the portion not including all the predetermined system data, wherein different respective portions of the predetermined system data are selected for the respective blocks of content data.

An embodiment comprises a system comprising a client system and a server system, wherein the output of the server system is arranged for providing the content data processed by the cryptographic unit of the server system to the input of the client system; and the key provider of the server system and the key provider of the client system are arranged for using a same portion of the software code in response to receiving the content data at the input of the server system and in response to receiving corresponding content data at the input of the client system, respectively.

An embodiment comprises a method of increasing data security, comprising receiving content data to be processed;

cryptographic processing of respective blocks of the content data in dependence on respective keys;

determining the respective key used for the processing of a respective block of the content data in dependence on a respective portion of predetermined system data to be protected, the portion not including all the predetermined system data, wherein different respective portions of the predetermined system data are selected for the respective blocks of content data.

An embodiment comprises a method of increasing data security, comprising receiving content data to be processed; providing processed content data to a client system, the client system comprising predetermined system data to be protected;

cryptographic processing of respective blocks of the content data in dependence on respective keys;

determining the respective key used for the processing of a respective block of the content data in dependence on a respective portion of the predetermined system data, the portion not including all the predetermined system data, wherein different respective portions of the predetermined system data are selected for the respective blocks of content data.

An embodiment comprises a computer program product comprising computer executable instructions for causing a processor to perform at least one of the methods set forth.

"White-Box Cryptography and an AES Implementation", by Stanley Chow, Philip Eisen, Harold Johnson, and Paul C. Van Oorschot, in Selected Areas in Cryptography: 9th Annual International Workshop, SAC 2002, St. John's, Newfoundland, Canada, Aug. 15-16, 2002, referred to hereinafter as "Chow 1", and "A White-Box DES Implementation for DRM Applications", by Stanley Chow, Phil Eisen, Harold Johnson, and Paul C. van Oorschot, in Digital Rights Management: ACM CCS-9 Workshop, DRM 2002, Washington, D.C., USA, Nov. 18, 2002, referred to hereinafter as "Chow 2", disclose methods with the intend to hide the key by a combination of encoding its tables with random bijections representing compositions rather than individual steps, and extending the cryptographic boundary by pushing it out further into the containing application.

In International Application Serial No. PCT/IB2007/050640, a method of protecting an integrity of a data processing system is disclosed. The method comprises determining a data string to be protected, an integrity of the data string being an indication of the integrity of the data processing system. A set of parameters is computed representing a predetermined data processing function, using a redundancy in the set of parameters to incorporate the data string into a bit representation of the set of parameters. The system is enabled to process data according to the set of parameters. The set of parameters represents at least part of a cryptographic algorithm including a cryptographic key. The set of parameters also represents a network of look-up tables. The network of look-up tables comprises a plurality of look-up tables of a white-box implementation of a data processing algorithm. The data processing algorithm comprises a cryptographic algorithm.

BRIEF DESCRIPTION OF THE DRAWINGS

These and other aspects of the invention will be further elucidated and described with reference to the drawing, in which.

DETAILED DESCRIPTION OF EMBODIMENTS

Tamper-resistant software is software in which it is difficult to perform targeted tampering. Software tamper-resistance is of crucial importance in many applications, e.g. digital rights management (DRM) clients, payment systems, and conditional access systems. One of the threats is that an attacker attempts to modify critical security data such as a Public Key or critical actions of the software such as access decisions. Note that code hardening in this context may be realized by obfuscating the program flow and thus hiding the critical portions of the program. Code hardening may also be realized by putting obstacles in the attacker's path even if he has full information about the location of the critical portions. One way to realize code hardening is to interweave many parts of the program, so as to force the attacker to modify significant portions of the code instead of merely the piece he is interested in changing.

One method of code hardening is verification of hashes of program code. The hashing method acts on contiguous memory addresses. It may be relatively easy for the attacker to identify which portions of the code are hashed. If a large block of code needs to be hardened against tampering, the hashing method may require a lot of work. It would be desirable to have a method that is more efficient for larger programs. Also it would be desirable to have a method in which the encrypted content (ciphertext) depends on the program code, i.e. a system in which the program code plays a key-like role. More generally, it would be desirable to guard a relatively large amount of data against tampering, where the data is preferably data that is available on the system, such as hardware identifier data, BIOS data, registry entries, or a content data fragment.

Although in this description, the emphasis is on the protection of software code, the concept can be extended to protect any type of data. In effect, the embodiments described will allow to use a relatively large body of data to be used as key data to a cryptographic algorithm. Such a large body of data is less vulnerable to be distributed by malicious entities than compared to for example the relatively small keys often used in cryptographic systems. Examples of predetermined system data to be protected include any data that is present on the system, hardware identifiers, BIOS, content, documents, registry settings, operating system elements, and more.

In an embodiment, program code that is running on some device is made tamper resistant. The method uses a cipher algorithm and is based on the idea that tampering with the code causes a (partial) loss of functionality for the user. Assume that a decryption algorithm has been implemented on the device. In an embodiment, the decryption algorithm depends on a key and on the program code. A modification to the program code implies that the decryption algorithm does no longer decrypt properly. Hence, the program code is relatively tamper resistant.

One approach to realize a dependency between the decryption algorithm and program code is to define the key as a code fragment. To illustrate this, suppose that the AES block cipher is applied. This block cipher consists of 10 rounds and each round is parameterised with a 128-bit round key. If each round key is defined as a 128-bit fragment of computer program, then this results in a total of 10×128=1280 bits of the program that are used in the round keys. These 1280 bits of computer program code thus are made tamper resistant, because a change in these bits of computer program code implies a change to the key, and the key is needed in unchanged form to obtain a desirable program behavior.

In an embodiment, a program of arbitrary size can be made tamper resistant. A block cipher with a block size of n bits is used as an example. When encrypting/decrypting content that possibly consists of more than n bits, multiple encryptions/decryptions need to be performed for multiple blocks of content. Block cipher modes have been developed that specify how the encryptions/decryptions are tied together. Let $p_i$ be the $i^{th}$ plaintext block and let $c_i$ be the corresponding $i^{th}$ ciphertext block. Ciphertext block $c_i$ depends on a code fragment $f_i$. In other words, both the encryption of $p_i$ and the decryption of $c_i$ depend on code fragment $f_i$. The code fragment on which $c_i$ depends is derived from the value $c_{i-1}$, which is the ciphertext block preceding $c_i$. As one property of ciphers is that the successive ciphertext blocks form a pseudo-random sequence, the code fragment on which $c_i$ depends is derived from a pseudo-random value; and hence the code fragment is selected pseudo-randomly.

A modification of a bit in code fragment f causes an incorrect encryption/decryption in the case that this encryption/decryption depends on f. Furthermore, the code fragments on which an encryption/decryption depends are selected in a pseudo-random way. Thus, an efficient method to make large software programs tamper resistant is provided.

Block ciphers usually encrypt/decrypt blocks of constant size, say n bits. The ways in which block ciphers are applied to content of more than those n bits are called block cipher modes. Several block cipher modes have been standardized by the NIST. The most popular of these modes is the CBC (Cipher Block Chaining) mode. This mode and other block cipher modes may be used without limitation. The CBC mode works as follows; see also FIGS. 1 and 2.

Figure 1:
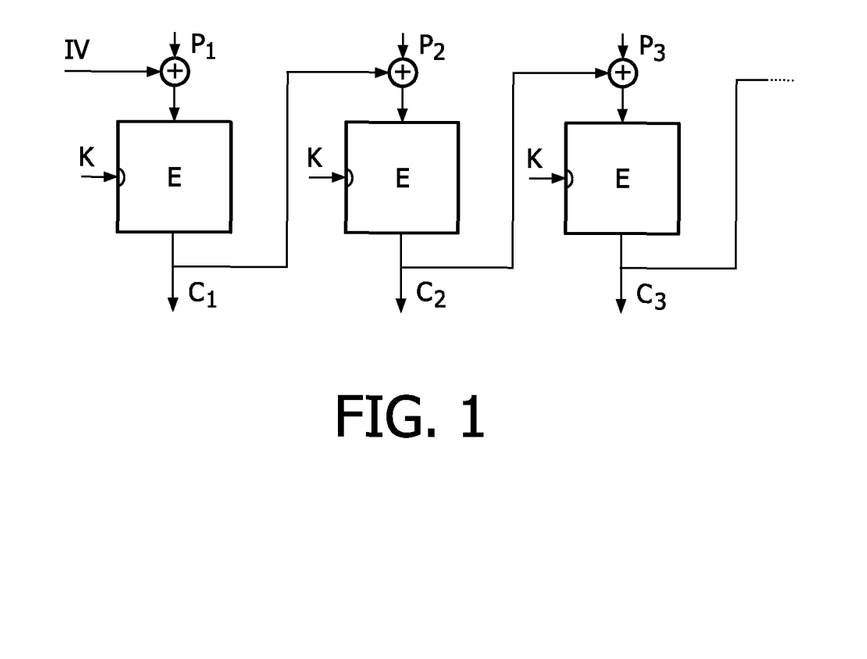
FIG. 1 is a diagram illustrating an encryption scheme.
Figure 2:
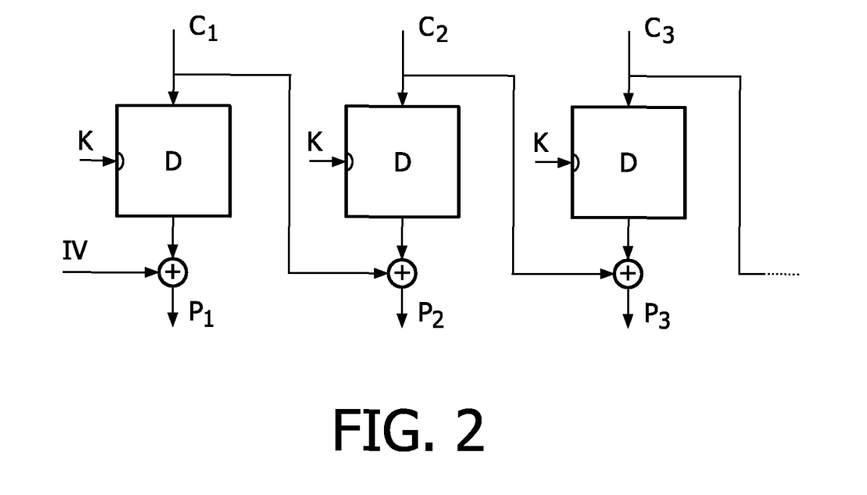
FIG. 2 is a diagram illustrating an decryption scheme.

Let the plaintext and ciphertext be divided into n-bit blocks. The $i^{th}$ plaintext block is denoted by $p_i$ and the $i^{th}$ ciphertext block by $c_i$. Furthermore, $E_K(p_i)$ denotes the encryption of $p_i$ with the key K and $D_K(c_i)$ denotes the decryption of $c_i$ with the key K. The relation between plaintext and ciphertext according to CBC is given by $c_i = E_K(p_i \oplus c_{i-1})$ and $p_i = D_K(c_i) \oplus c_{i-1}$, where $c_0$ is defined as some initial value IV, and $\oplus$ denotes the XOR operation. The idea behind this block cipher mode is that plaintext block i is randomized by adding ciphertext block i−1 to it.

In an embodiment, CBC mode is used. Other block cipher modes can be used as well. To realize a dependency between program code and encryption/decryption, two questions arise. First, the question arises which code fragment is made dependent on the $i^{th}$ encryption/decryption. Second, the question arises how the dependency is realized.

The first question is answered as follows. Let cipher text block i−1 determine the code fragment that is made dependent on the $i^{th}$ encryption/decryption. This can, for instance, be realized as follows. Suppose that the software code that needs to be made tamper resistant is stored in memory in the addresses 0, 1, . . . , $2^8-1$. However, this is only an example. A larger number of addresses can be used in a straightforward way. Each address contains one word of the program. Furthermore, suppose that each encryption/decryption in the block cipher mode is made dependent on a code fragment consisting of m words. Then encryption/decryption i+1 is made dependent on a software code fragment at the addresses $$c_{i-1} \bmod 2^8, (c_{i-1}+1) \bmod 2^8, \ldots, (c_{i-1}+m) \bmod 2^8.$$

Because a sequence of ciphertext blocks can be seen as a pseudo-random bit stream, this strategy has the property that in each encryption/decryption a (pseudo-)random code fragment is checked for integrity. This implies that relatively large programs can be made tamper resistant, as each change in the program ultimately results in an incorrect encryption/decryption.

Figure 3:
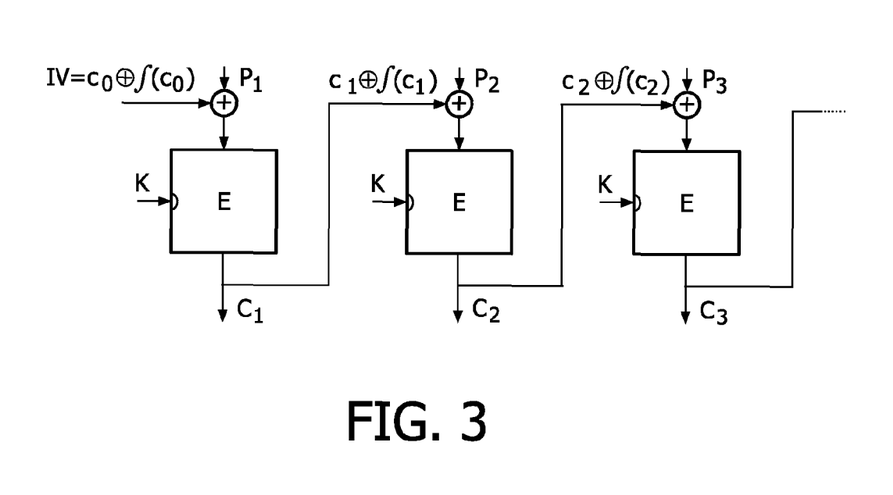
FIG. 3 is a diagram illustrating an encryption scheme.
Figure 4:
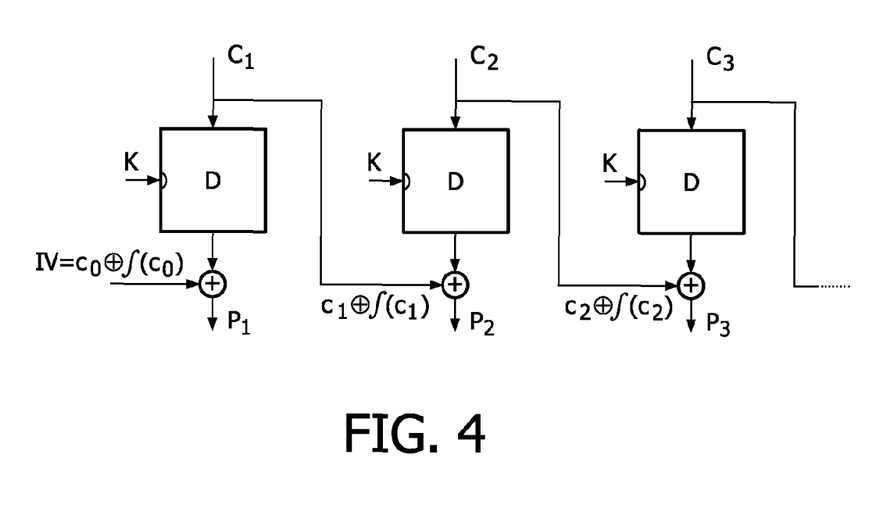
FIG. 4 is a diagram illustrating an decryption scheme.

The second question that arises is how to realize a dependency between a block encryption/decryption and a code fragment. In CBC mode, the $i^{th}$ encryption/decryption is made dependent on the $(i-1)^{th}$ cipherblock. In the same way as this dependency is created, a dependency on a code fragment can be created. This means that if the $i^{th}$ encryption/decryption depends on code fragment $f(c_{i-1})$ consisting of n bits (where n bits is the block size), then ciphertext block $c_i$ and plaintext block $p_i$ are given by $c_i=E_K(p_i \oplus c_{i-1} \oplus f(c_{i-1}))$ and $p_i=D_K(c_i) \oplus c_{i-1} f(c_{i-1})$, respectively. This is visualized in FIGS. 3 and 4.

Figure 5:
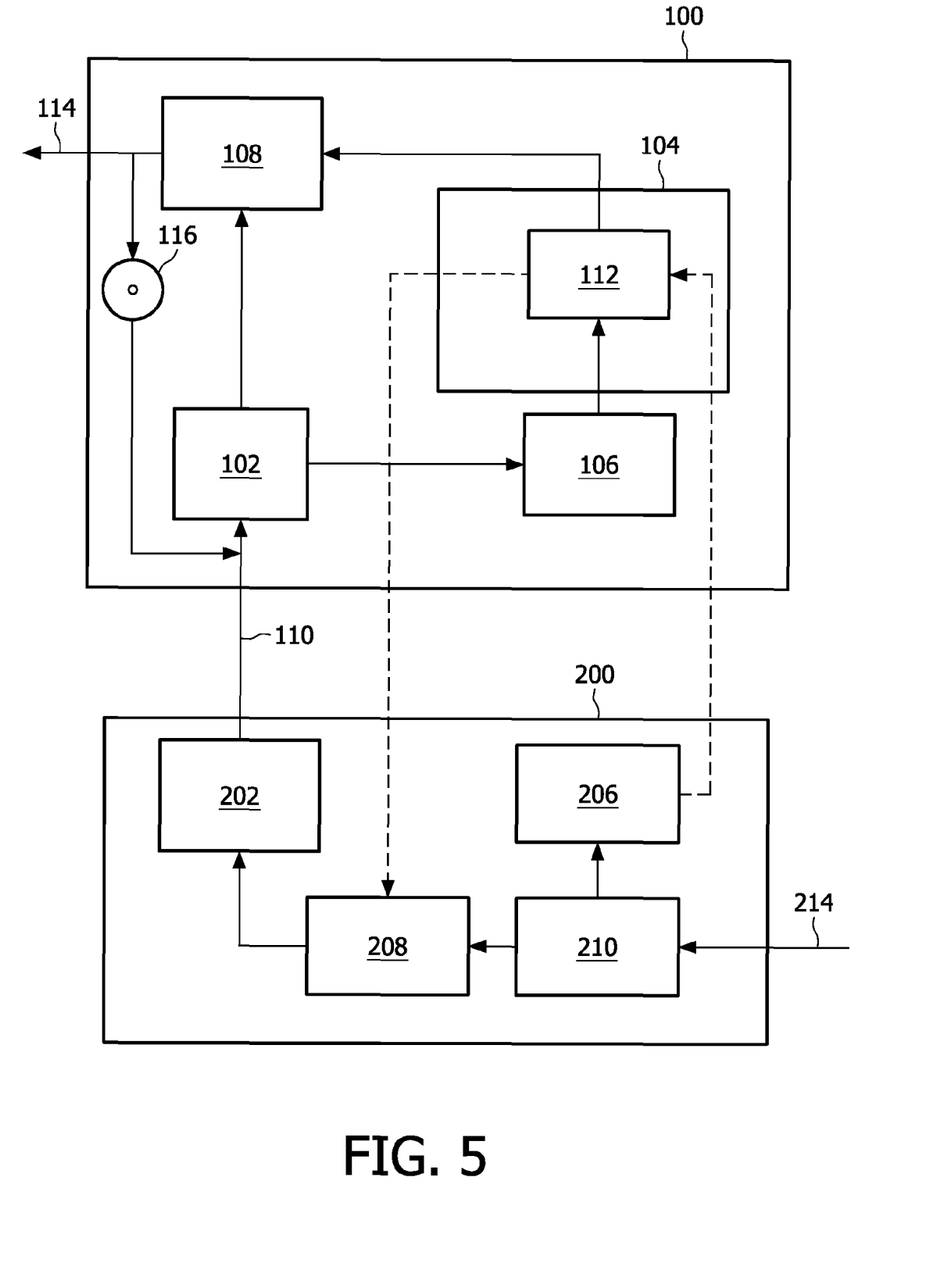
FIG. 5 is a diagram illustrating an embodiment.

FIG. 5 illustrates an embodiment of the invention. The figure shows a system 100 for processing data. The system may be a client system. The figure also shows a server system 200 for processing data. For example, the server 200 prepares processed data 110 which is provided to the client 100, for example by transmission via a data network such as the Internet or by means of a removable storage medium such as a CD-ROM disk. The data may also originate from an internal storage medium 116.

The Figure shows an input 102. The input 102 receives data that needs to be processed. It receives the data for example from a server 200. The data may also be received from a local data storage 116. The data may also be received from another application running locally or from a user input. The data may comprise for example a data file, an image, an audio file, a movie, or streaming media content such as streaming video or streaming audio. The data may be encrypted, and the processing may be decryption of the encrypted data. The processing may also involve signing or watermarking of the data, or verifying a signature or a watermark of the data. The data is forwarded to selector 106.

A key provider 106 selects a portion 112 of the software code to be used when processing the received content. Preferably, the selector 106 is implemented such that it selects different portions of code regularly, to achieve that all of the software code 104 is selected from time to time. The key provider 106 provides a cryptographic key in dependence on the selected portion 112. The selected portion 112 may directly represent a cryptographic key, or the cryptographic key may be derived from this portion 112. For example the key may be computed as a hash function of the contents of the portion of the code. Preferably, the key provider 106 is arranged for selecting the portion based on the ciphertext. If a block cipher is used, then a previously processed data block may be used.

A cryptographic unit 108 performs the cryptographic processing of the data retrieved via the input 102 and in dependence on the key provided by the key provider 106. The cryptographic processing may comprise decrypting the content, using the provided key. The cryptographic unit may also use a bit representation of the selected portion directly as a key, for example by XOR'ing the bits of the selected portion with the plaintext or ciphertext. Any linear or nonlinear operation involving the selected portion 112 and the content 110 may be used to create a dependency between the two. The cryptographic processing may also involve encryption and/or digital signing and/or digital watermarking. However, these are non-limiting examples of the cryptographic processing.

The output of the cryptographic unit 108 is the cryptographically processed data 114. This data is output for storage 116 or for transmission or for further processing and/or rendering. For example, the output data 114 may comprise a video signal for rendering on a television.

The system 100 may be used for secure storage of data on a local or remote storage medium 116. The storage 116 is used for storing a ciphertext corresponding to the content data. Whenever the data needs to be decrypted, the encrypted content stored in the storage 116 is fed to the cryptographic unit 108 and to the key provider 106, via the input 102.

The encrypted data stored on the storage 116 may be received from an external source. However, it may also be generated by the system itself; for example, a user profile or a user's documents or audio/video content may be stored securely in an encrypted form. To that end, preferably the cryptographic unit comprises both an encrypter and a decrypter. Unencrypted data received from the input 102 is first encrypted using the key provider 106 and the cryptographic unit 108 and the thus encrypted data 114 is stored in storage 116, and then whenever needed the stored encrypted data is fed from storage 116 to input 102 and from there to the key provider 106 and cryptographic unit 108 to obtain decrypted data at output 114.

Alternatively the cryptographic unit is applies a digital watermark to the content data in dependence on the selected portion 112 of the software code 104.

An embodiment comprises a server system 200. This server system 200 is used for preparing the content data before it is provided to the input 112 of the client 100. The server 200 and client 100 may be running on different computers. The server 200 and client 100 may also consist of different processes running on a single machine. The server 200 has a knowledge of the software code used on the client 100. This knowledge is at least sufficient to produce content data that can be properly processed on the client 100 in dependence on selected portions 112 of the software code 104. For example the server has a list of pre-computed cryptographic keys that correspond to the different portions 112 of code that may be selected by the key provider 106. Alternatively the key provider 206 has a local copy of the software code 104. Alternatively, as an example, the selector 206 of the server 200 has access to the actual code 104 stored in the client 100. The server system 200 comprises an output 202, a key provider 206, a cryptographic unit 208, and an input 210. Content data 214 is received by input 210 and forwarded to the key provider 206 and to the cryptographic unit 208. The key provider 206 selects a portion 112 of the software code 104 and provides a key to the cryptographic unit 208 in dependence on the selected portion 112. This key is used by the cryptographic unit 208 for cryptographic processing of the input content data. The processed content data 110 is provided via an output 202 to the input 102 of the client system 100.

An embodiment comprises a method of increasing data security, comprising receiving content data (110) to be processed; cryptographic processing of respective blocks of the content data in dependence on respective keys; determining the respective key used for the processing of a respective block of the content data in dependence on a respective portion (112) of predetermined system data (104) to be protected, the portion not including all the predetermined system data, wherein different respective portions of the predetermined system data are selected for the respective blocks of content data according to a predetermined scheme.

An embodiment comprises a method of increasing data security, comprising receiving content data (214) to be processed; providing processed content data (110) to a client system (100), the client system comprising predetermined system data (104) to be protected; cryptographic processing of respective blocks of the content data in dependence on respective keys; determining the respective key used for the processing of a respective block of the content data in dependence on a respective portion (112) of the predetermined system data (104), the portion not including all the predetermined system data, wherein different respective portions of the predetermined system data are selected for the respective blocks of content data according to a predetermined scheme.

An embodiment comprises a computer program product comprising computer executable instructions for causing a processor to perform any of the methods set forth.

Figure 6:
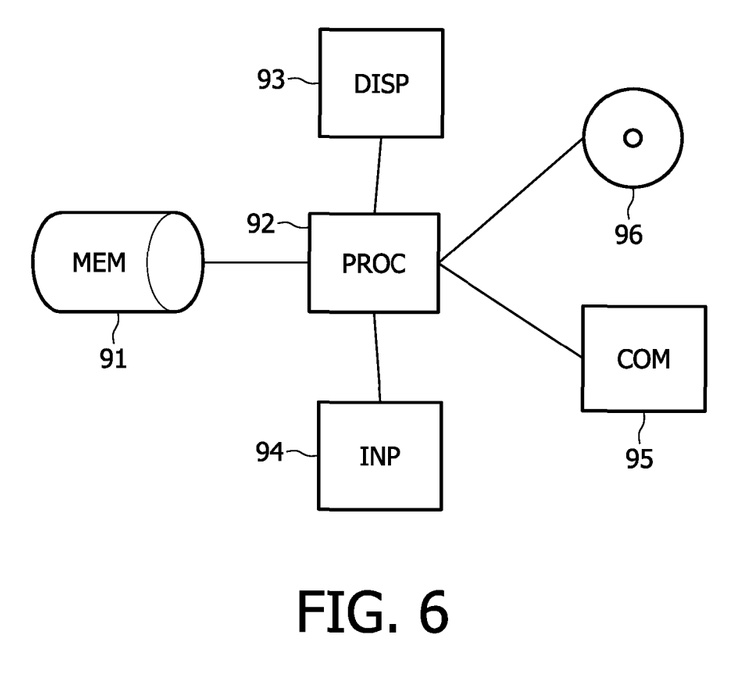
FIG. 6 is a diagram illustrating an embodiment.

FIG. 6 illustrates an example hardware architecture suitable for implementing the described systems and methods. The hardware architecture may be implemented in, for example, a personal computer, a set-top box, a television set, or a digital video player/recorder. A server system 200 may be implemented in, for example, a server computer. The figure shows a processor 92 for controlling memory 91, display 93 (or a connector for a display), input 94 (e.g. keyboard, mouse, remote control), communications port 95 (e.g. Ethernet, wireless network, antenna cable input), and storage medium 96 (e.g. a removable storage medium such as a compact disc, CD-ROM, DVD, external flash memory, or an internal non-volatile storage medium such as a hard disc). The memory 91 comprises computer instructions for causing the processor to perform one or more of the methods set forth. These computer instructions may be loaded into the memory 91 from the storage medium 96 or from the Internet via communications port 95. The input 94 is used to enable a user to interact with the system. The display is used for interaction with the user and optionally for rendering video or still images. Loudspeakers (not shown) may also be provided for user interaction and/or rendering audio content. Both the server system and the client system may be implemented as software applications on the same hardware system of FIG. 6, and they may run simultaneously and communicate with one another via inter-process communication. Alternatively, the client and server may run on separate hardware systems, both having an architecture similar to FIG. 6. For example the server is located and owned by a content provider and the client is owned by a consumer and located in a consumer home.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. The carrier may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for increasing data security by protecting system software, the system comprising:
    an input for receiving content data, wherein the content data is configured to be processed;
    a memory storing predetermined system data, wherein the predetermined system data is configured to be protected and comprises software code comprising computer executable instructions;
    a cryptographic unit for cryptographic processing of respective blocks of the content data based on respective cryptographic keys;
    a key provider for selecting a respective portion of the software code for a respective block of the content data such that different respective portions of the software code are selected for the respective blocks of the content data, and determining the respective cryptographic key used for the processing of the respective block of the content data based on the respective portion of the software code, the portion of the software code not including all the software code.

2. The system according to claim 1, wherein the key provider selects the respective portion of the software code based on the content data outside the respective block of the content data.

3. The system according to claim 2, wherein the key provider selects the respective portion of the software code based on a ciphertext of the content data outside the respective block of content data.

4. The system according to claim 3, wherein the key provider selects the respective portion of the software code based on the ciphertext of a previously processed data block.

5. The system according to claim 1, wherein the cryptographic unit applies an XOR operation involving at least part of the respective key and at least part of the respective block of the content data.

6. The system according to claim 1, further comprising a storage for storing encrypted content data corresponding to the content data, wherein the cryptographic unit decrypts the encrypted content data.

7. The system according to claim 6, wherein the cryptographic unit comprises an encrypter for encrypting the respective blocks of the content data based on the respective keys and a decrypter for decrypting respective blocks of the encrypted content data based on the respective keys.

8. The system according to claim 1, wherein the cryptographic unit applies a digital watermark to the content data based on the respective key.

9. The system of claim 1, wherein the respective cryptographic key comprises one or more of the respective portion of the software code and a pseudo-random function of the respective portion of the software code.

10. A server system for increasing data security by protecting system software, the system comprising:

an input for receiving content data, wherein the content data is configured to be processed;

an output for transmitting processed content data to a client system, the client system including a memory storing predetermined system data, wherein the predetermined system data is configured to be protected and comprises software code comprising computer executable instructions;

a cryptographic unit for cryptographic processing of respective blocks of the content data based on respective cryptographic keys;

a key provider for selecting a respective portion of the software code for a respective block of the content data such that different respective portions of the software code are selected for the respective blocks of content data, and determining the respective cryptographic key used for the processing of the respective block of the content data based on the respective portion of the software code, the portion of the software code not including all data software code.

11. The server system of claim 10, wherein the respective cryptographic key comprises one or more of the respective portion of the software code and a pseudo-random function of the respective portion of the software code.

12. A client system for increasing data security by protecting system software, the client system comprising:

an input for receiving content data from a server system, wherein the content data is configured to be processed;

a memory storing predetermined system data, wherein the predetermined system data is configured to be protected and comprises software code comprising computer executable instructions;

a cryptographic unit for cryptographic processing of respective blocks of the content data based on respective cryptographic keys;

a key provider for selecting a respective portion of the software code for a respective block of the content data such that different respective portions of the software code are selected for the respective blocks of content data, wherein the key provider is configured to select the same portion of software code selected by a server key provider on the server system during cryptographic processing of the respective block of the content data on the server system, and determining the respective cryptographic key used for the processing of the respective block of the content data based on the respective portion of the software code, the portion of the software code not including all the software code.

13. The client system of claim 12, wherein the respective cryptographic key comprises one or more of the respective portion of the software code and a pseudo-random function of the respective portion of the software code. NEW 14. A method executed by one or more computing devices of increasing data security by protecting system software, the method comprising:

receiving, by at least one of the one or more computing devices, content data, wherein the content data is configured to be processed;

cryptographically processing, by at least one of the one or more computing devices, respective blocks of the content data based on respective cryptographic keys;

selecting, by at least one of the one or more computing devices, in the computer a respective portion of software code for a respective block of the content data such that different respective portions of the software code are selected for the respective blocks of the content data; and determining, by at least one of the one or more computing devices, the respective cryptographic key used for the processing of the respective block of the content data based on the respective portion of the software code, wherein the software code comprises computer executable instructions, the portion of the software code not including all the software code.

15. The method of claim 14, wherein the respective cryptographic key comprises one or more of the respective portion of the software code and a pseudo-random function of the respective portion of the software code.

16. A method executed by one or more computing devices of increasing data security by protecting system software, the method comprising:

receiving, by at least one of the one or more computing devices, content data, wherein the content data is configured to be processed;

transmitting, by at least one of the one or more computing devices, processed content data to a client system, the client system storing predetermined system data, wherein the predetermined system data is configured to be protected and comprises software code comprising computer executable instructions;

cryptographically processing, by at least one of the one or more computing devices, respective blocks of the content data based on respective cryptographic keys;

selecting, by at least one of the one or more computing devices, a respective portion of software code for a respective block of the content data such that different respective portions of the software code are selected for the respective blocks of the content data; and determining the respective cryptographic key used for the processing of the respective block of the content data based on the respective portion of the software code, the portion of the software code not including all the software code.

17. The method of claim 16, wherein the respective cryptographic key comprises one or more of the respective portion of the software code and a pseudo-random function of the respective portion of the software code.

18. At least one non-transitory computer-readable medium storing computer-readable instructions that, when executed by one or more computing devices, cause at least one of the one or more computing devices to:

receive content data, wherein the content data is configured to be processed;

cryptographically process respective blocks of the content data based on respective cryptographic keys;

select a respective portion of software code for a respective block of the content data such that different respective portions of the software code are selected for the respective blocks of the content data; and determine the respective cryptographic key used for the processing of the respective block of the content data based on the respective portion of the software code, the portion of the software code not including all the software code.

19. The at least one non-transitory computer-readable medium of claim 18, wherein the respective cryptographic key comprises one or more of the respective portion of the software code and a pseudo-random function of the respective portion of the software code.

* * * * *